US011927908B2

(12) United States Patent
Hoshi et al.

(10) Patent No.: US 11,927,908 B2
(45) Date of Patent: Mar. 12, 2024

(54) IMAGE FORMING APPARATUS

(71) Applicants: Shotaro Hoshi, Kanagawa (JP); Yusuke Mitani, Kanagawa (JP)

(72) Inventors: Shotaro Hoshi, Kanagawa (JP); Yusuke Mitani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/866,520

(22) Filed: Jul. 17, 2022

(65) Prior Publication Data

US 2023/0056875 A1 Feb. 23, 2023

(30) Foreign Application Priority Data

Aug. 20, 2021 (JP) ................................. 2021-135135

(51) Int. Cl.
*G03G 21/00* (2006.01)
*G03G 15/16* (2006.01)

(52) U.S. Cl.
CPC ....... *G03G 21/0041* (2013.01); *G03G 15/161* (2013.01)

(58) Field of Classification Search
CPC ......................... G03G 21/0041; G03G 15/161
See application file for complete search history.

(56) References Cited

U.S. PATENT DOCUMENTS 7,877,054 B1 * 1/2011 Thayer ............... G03G 21/0094 399/346
2015/0037054 A1 2/2015 Nagata et al.
2015/0117884 A1 4/2015 Sugiyama et al.
2015/0268591 A1 9/2015 Fujita et al.
2015/0378284 A1 12/2015 Wada et al.
2016/0033915 A1 2/2016 Kumagai et al.
2017/0185022 A1 * 6/2017 Tsuda ................ G03G 15/5058
2022/0121138 A1 4/2022 Yamada et al.

FOREIGN PATENT DOCUMENTS

JP 2014-126636 7/2014
JP 2017-015807 1/2017
JP 2018-120183 8/2018

* cited by examiner

*Primary Examiner* — Stephanie E Bloss
*Assistant Examiner* — Michael A Harrison
(74) *Attorney, Agent, or Firm* — Duft & Bornsen, PC

(57) ABSTRACT

An image forming apparatus include an image forming device, an image bearer, a transferrer, a cleaner, and an adhesion amount detector. The image forming device forms, on the image bearer, a toner image to be transferred to a recording medium and a toner image pattern to be input to the cleaner without being transferred to the recording medium. The cleaner cleans the image bearer. The adhesion amount detector detects a toner adhesion amount of the toner image. The toner image pattern is a belt-shaped pattern elongated in an orthogonal direction orthogonal to a traveling direction of the image bearer and having a greater amount of toner input to a portion of the cleaner corresponding to a position of the adhesion amount detector in the orthogonal direction than that input to a portion of the cleaner not corresponding to the position of the adhesion amount detector in the orthogonal direction.

7 Claims, 7 Drawing Sheets

IMAGE FORMING APPARATUS

CROSS-REFERENCE TO RELATED APPLICATION

This patent application is based on and claims priority pursuant to 35 U.S.C. § 119(a) to Japanese Patent Application No. 2021-135135, filed on Aug. 20, 2021, in the Japan Patent Office, the entire disclosure of which is hereby incorporated by reference herein.

BACKGROUND

Technical Field

Embodiments of the present disclosure relate to an image forming apparatus.

Related Art

An image forming apparatus in the related art includes: an image forming device that forms a toner image, an image bearer that bears the toner image formed by the image forming device, a transferrer that transfers the toner image from the image bearer to a recording medium, a cleaner that cleans a surface of the image bearer, and an adhesion amount detector that is disposed facing the surface of the image bearer to detect a toner adhesion amount of the toner image. The image forming device forms, on the image bearer, a toner image pattern to be input to the cleaner without being transferred to the recording medium.

SUMMARY

In one embodiment of the present disclosure, a novel image forming apparatus includes an image forming device, an image bearer, a transferrer, a cleaner, and an adhesion amount detector. The image forming device forms a toner image. The image bearer bears the toner image formed by the image forming device. The transferrer transfers the toner image from the image bearer to a recording medium. The cleaner cleans a surface of the image bearer. The adhesion amount detector facing the surface of the image bearer detects a toner adhesion amount of the toner image. The image forming device forms, on the image bearer, a toner image pattern to be input to the cleaner without being transferred to the recording medium. The toner image pattern is a belt-shaped pattern elongated in an orthogonal direction orthogonal to a traveling direction of the image bearer. The toner image pattern has a greater amount of toner input to a portion of the cleaner corresponding to a position of the adhesion amount detector in the orthogonal direction than an amount of toner input to a portion of the cleaner not corresponding to the position of the adhesion amount detector in the orthogonal direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
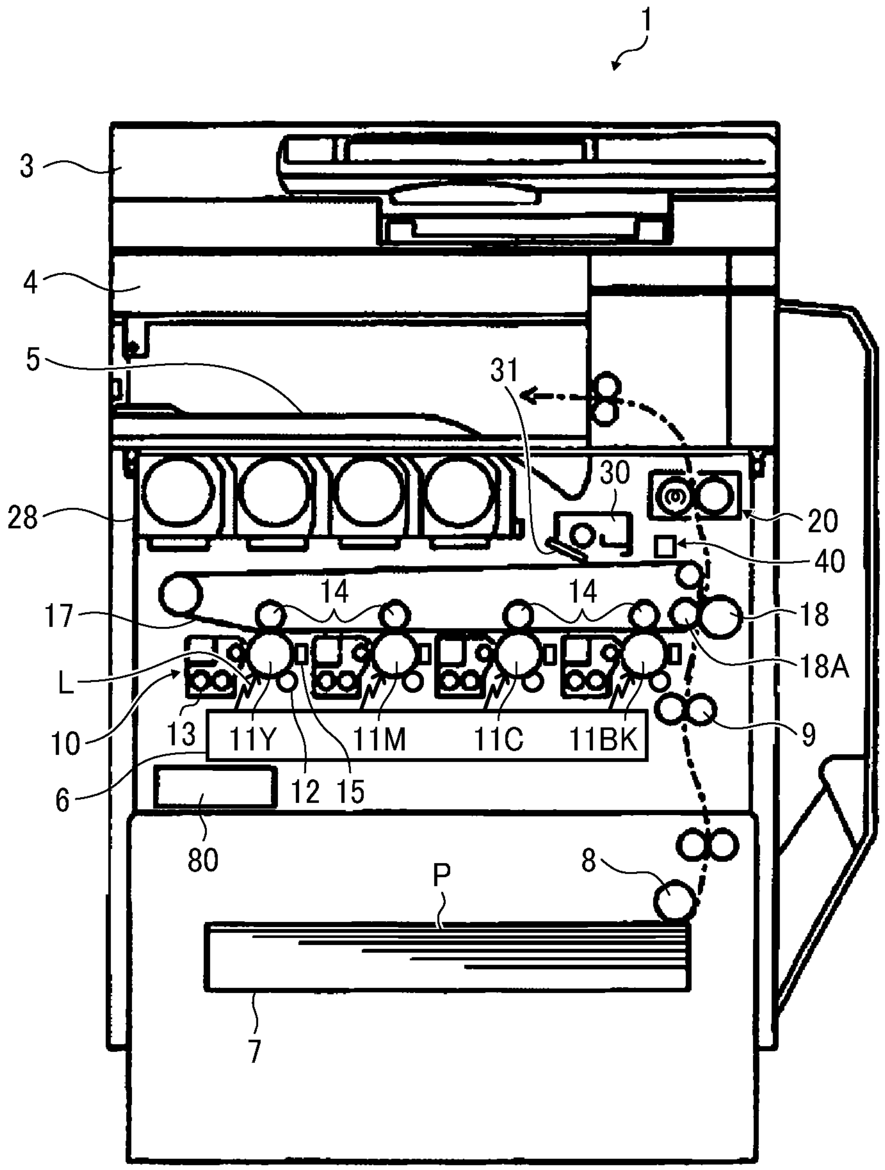
FIG. 1 is a schematic view of a tandem color copier as an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Identical reference numerals are assigned to identical components or equivalents and redundant descriptions of those components may be simplified or omitted. Note that, in the following description, suffixes Y, M, C, and BK denote colors of yellow, magenta, cyan, and black, respectively. To simplify the description, these suffixes are omitted unless necessary.

FIG. 1 is a schematic view of a tandem color copier, which may be referred to simply as a copier in the following description, as an image forming apparatus according to the present embodiment.

In FIG. 1, a tandem color copier 1, which may be referred to simply as a copier 1 in the following description, as an image forming apparatus includes a document conveying device 3 that conveys a document to a document reading device 4, the document reading device 4 that reads image information of the document, an output tray 5 on which output images lie stacked, and a sheet feeding device 7 that accommodates sheets P as recording media.

The copier 1 further includes a registration roller pair 9 (as a timing roller pair) that adjusts the time when to convey the sheet P and an image forming device 10 that forms toner images of yellow, magenta, cyan, and black. The image forming device 10 includes, e.g., drum-shaped photoconductors 11Y, 11M, 11C, and 11BK as latent image bearers on which the toner images of yellow, magenta, cyan, and black are formed, respectively. The image forming device 10 further includes a writing device 6 (as an exposure device) and, around each of the photoconductors 11Y, 11M, 11C, and 11BK, a charging device 12 and a developing device 13, for example. Specifically, the charging device 12 uniformly charges the surface of the corresponding one of the photoconductors 11Y, 11M, 11C, and 11BK. The writing device 6 emits laser light according to input image information and writes electrostatic latent images on the photoconductors 11Y, 11M, 11C, and 11BK. The developing device 13 develops the electrostatic latent image written on the corresponding one of the photoconductors 11Y, 11M, 11C, and 11BK. Primary-transfer bias rollers 14 are also disposed to transfer the toner images formed on the photoconductors 11Y, 11M, 11C, and 11BK onto an intermediate transfer belt 17 so that the toner images of yellow, magenta, cyan, and black are superimposed one atop another on the intermediate transfer belt 17.

The copier 1 further includes the intermediate transfer belt 17 as an image bearer on which the toner images of a plurality of colors are transferred and overlapped and a secondary transfer roller 18 as a transferrer that transfers a color toner image from the intermediate transfer belt 17 onto the sheet P. The copier 1 further includes a fixing device 20 that fixes an unfixed image on the sheet P and a toner container 28 that contains toner for each color of yellow, cyan, magenta, and black to be supplied to the developing device 13. The copier 1 further includes a belt cleaning device 30 that removes toner (untransferred toner) adhering to an outer circumferential surface of the intermediate transfer belt 17. The copier 1 further includes a waste toner collecting container 80 that collects, as waste toner, the untransferred toner removed by the belt cleaning device 30, for example.

Now, a description is given of a regular color image forming operation performed by the copier 1 as an image forming apparatus.

The document conveying device 3 conveys a document from a document tray with conveyance rollers to load the document on a platen of the document reading device 4. The document reading device 4 optically reads the image information of the document loaded on the platen.

Specifically, the document reading device 4 scans an image of the document on the platen while irradiating the image with light emitted from an illumination lamp and forms an image of light reflected from the document on a color sensor via a mirror group and a lens. The color sensor reads the color image information of the document for each of decomposed light colors of red, green, and blue (RGB) and converts the color image information into electrical image signals. An image processing device performs processing such as color conversion, color calibration, and spatial frequency correction based on the electrical image signals of the decomposed light colors of RGB to acquire color image information of yellow, magenta, cyan, and black.

The image information for each color of yellow, magenta, cyan, and black is sent to the writing device 6. The writing device 6 emits laser light L toward the surface of the photoconductors 11Y, 11M, 11C, and 11BK according to the image information for each color of yellow, magenta, cyan, and black, respectively.

Each of the four photoconductors 11Y, 11M, 11C, and 11BK rotates clockwise in FIG. 1. In a charging process, the surface of each of the photoconductors 11Y, 11M, 11C, and 11BK is uniformly charged at a position at which the surface of each of the photoconductors 11Y, 11M, 11C, and 11BK faces the charging device 12. Thus, a charging potential is formed on the surface of each of the photoconductors 11Y, 11M, 11C, and 11BK. Thereafter, the charged surface of each of the photoconductors 11Y, 11M, 11C, and 11BK reaches an irradiation position to be irradiated with the corresponding laser light.

In an exposure process, four light sources of the writing device 6 emit laser light according to the image signals for the respective colors of yellow, cyan, magenta, and black. The laser light passes through a separate optical path for each color component of yellow, magenta, cyan, and black.

The laser light corresponding to the yellow component is emitted to the surface of the leftmost photoconductor 11Y in FIG. 1. At this time, the laser light corresponding to the yellow component is directed by a polygon mirror rotating at high speed in an axial direction of the photoconductor 11Y (i.e., a main scanning direction). Thus, an electrostatic latent image corresponding to the yellow component is formed on the surface of the photoconductor 11Y charged by the charging device 12.

Similarly, the laser light corresponding to the magenta component is emitted to the surface of the second photoconductor 11M from the left in FIG. 1. Thus, an electrostatic latent image corresponding to the magenta component is formed. The laser light corresponding to the cyan component is emitted to the surface of the third photoconductor 11C from the left in FIG. 1. Thus, an electrostatic latent image corresponding to the cyan component is formed. The laser light corresponding to the black component is emitted to the surface of the fourth photoconductor 11BK from the left in FIG. 1. Thus, an electrostatic latent image corresponding to the black component is formed.

Thereafter, the surface bearing the electrostatic latent image for the corresponding color of each of the photoconductors 11Y, 11M, 11C, and 11BK reaches a position at which the surface bearing the electrostatic latent image faces the developing device 13. In a developing process, the developing device 13 supplies toner of the corresponding color onto the corresponding one of the photoconductors 11Y, 11M, 11C, and 11BK to develop the electrostatic latent image formed on the corresponding one of the photoconductors 11Y, 11M, 11C, and 11BK.

The surface of each of the photoconductors 11Y, 11M, 11C, and 11BK after the developing process reaches a position at which the surface after the developing process faces the intermediate transfer belt 17 as an image bearer. Each of the primary-transfer bias rollers 14 is disposed at the position at which the surface after the developing process faces the intermediate transfer belt 17, so as to contact an inner circumferential surface of the intermediate transfer belt 17. In a primary transfer process, at the positions of the primary-transfer bias rollers 14, the toner images of yellow, magenta, cyan, and black formed on the photoconductors 11Y, 11M, 11C, and 11BK, respectively, are transferred onto the intermediate transfer belt 17 successively so that the toner images of yellow, magenta, cyan, and black are superimposed one atop another on the intermediate transfer belt 17.

The surface of each of the photoconductors 11Y, 11M, 11C, and 11BK after the primary transfer process reaches a position at which the surface after the transfer process faces a cleaning device 15. In a cleaning process, the cleaning device 15 removes and collects untransferred toner remaining on the corresponding one of the photoconductors 11Y, 11M, 11C, and 11BK. The untransferred toner removed and collected by the cleaning device 15 is conveyed to and collected in the waste toner collecting container 80 as waste toner via a conveyance passage. The surface of each of the photoconductors 11Y, 11M, 11C, and 11BK after the cleaning process passes by a charge neutralizing device. Thus, a series of image forming processes performed on the photoconductors 11Y, 11M, 11C, and 11BK is completed.

On the other hand, the intermediate transfer belt 17 (as an image bearer) bearing a color toner image formed of the superimposed toner images of yellow, magenta, cyan, and black primarily transferred from the respective photoconductors 11Y, 11M, 11C, and 11BK travels counterclockwise in FIG. 1 and reaches a position at which the color toner image faces the secondary transfer roller 18. The secondary transfer roller 18 contacts the intermediate transfer belt 17 to form a secondary transfer nip as a transfer nip. In a secondary transfer process, the color toner image borne on the intermediate transfer belt 17 is secondarily transferred onto the sheet P at the secondary transfer nip.

A secondary transfer bias is applied to an opposed roller 18A facing the secondary transfer roller 18 via the intermediate transfer belt 17. The secondary transfer roller 18 is electrically grounded. When the color toner image on the intermediate transfer belt 17 is secondarily transferred onto the sheet P, a transfer bias having a negative polarity, which is a normal charging polarity of the toner, is applied to the opposed roller 18A so that the normally charged toner having the negative polarity on the intermediate transfer belt 17 is repulsively transferred onto the sheet P.

The outer circumferential surface of the intermediate transfer belt 17 after the secondary transfer process reaches a position of the belt cleaning device 30. The belt cleaning device 30 includes a cleaning blade 31 as a cleaner. The cleaning blade 31 removes the toner (untransferred toner) adhering onto the intermediate transfer belt 17. The toner removed by the cleaning blade 31 is conveyed to and collected in the waste toner collecting container 80 as waste toner via a conveyance passage.

The sheet P is conveyed from the sheet feeding device 7 via, e.g., the registration roller pair 9 to the secondary transfer nip between the intermediate transfer belt 17 and the secondary transfer roller 18.

Specifically, the sheet P fed by a sheet feeding roller 8 from the sheet feeding device 7 that accommodates the sheets P passes through a conveyance guide and is directed to the registration roller pair 9. The sheet P reaching the registration roller pair 9 is conveyed toward the secondary transfer nip such that the sheet P meets the color toner image on the intermediate transfer belt 17 at the secondary transfer nip.

The sheet P on which the full-color image (i.e., the color toner image) has been transferred in the secondary transfer process is then guided to the fixing device 20. The fixing device 20 fixes the full-color image onto the sheet P at a nip between a fixing roller and a pressure roller. The sheet P after the fixing process is ejected by an output roller pair as an output image to an outside of an apparatus body of the copier 1. Thus, the sheets P lie stacked on the output tray 5. Accordingly, a series of image forming processes is completed.

The copier 1 performs control called process control at a given point in time to keep the image quality stable over time or even when the environment changes.

Figure 2:
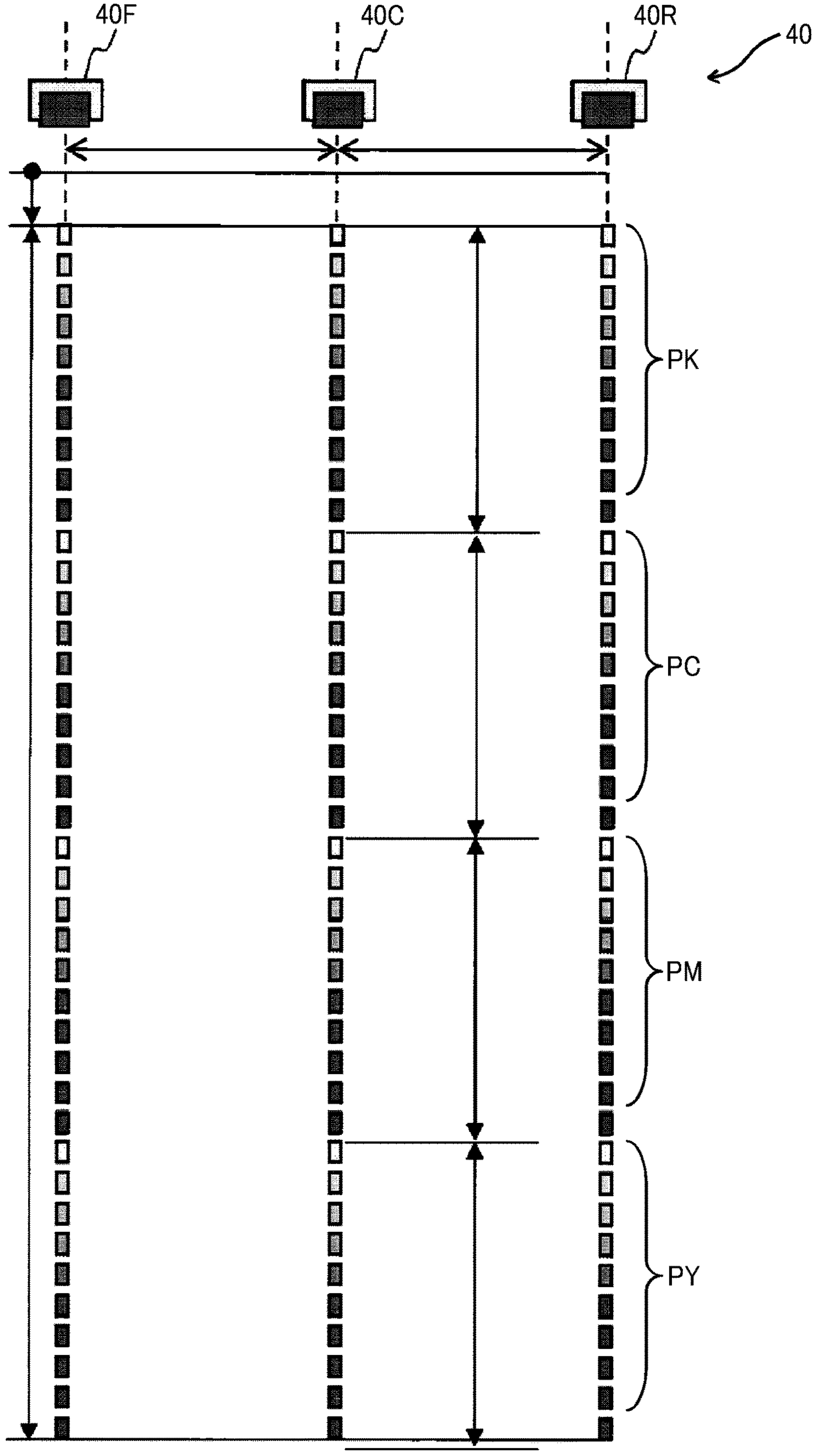
FIG. 2 is a schematic diagram illustrating gradation patterns on an intermediate transfer belt.

FIG. 2 is a schematic diagram illustrating gradation patterns on the intermediate transfer belt 17.

Each of the gradation patterns includes a plurality of toner patches having different image densities. The gradation patterns are formed at positions on the intermediate transfer belt 17 facing an optical sensor device 40. Specifically, the plurality of toner patches of each of the gradation patterns is formed at the center and opposed ends in a width direction of the intermediate transfer belt 17 on the intermediate transfer belt 17. In the example illustrated in FIG. 2, gradation patterns PK, PC, PM, and PY for black, cyan, magenta, and yellow, respectively, are formed from the top in FIG. 2.

The optical sensor device 40 includes optical sensors 40R, 40C, and 40F as a plurality of adhesion amount detectors aligned at given intervals in the width direction of the intermediate transfer belt 17. Each of the optical sensors 40R, 40C, and 40F outputs a signal corresponding to the light reflectance of the intermediate transfer belt 17 or the gradation patterns PK, PC, PM, and PY on the intermediate transfer belt 17, thus detecting a toner adhesion amount, which is an amount of toner adhering to the intermediate transfer belt 17. The copier 1 adjusts an image forming condition such as a developing bias Vb based on the detected toner adhesion amount.

Figure 3:
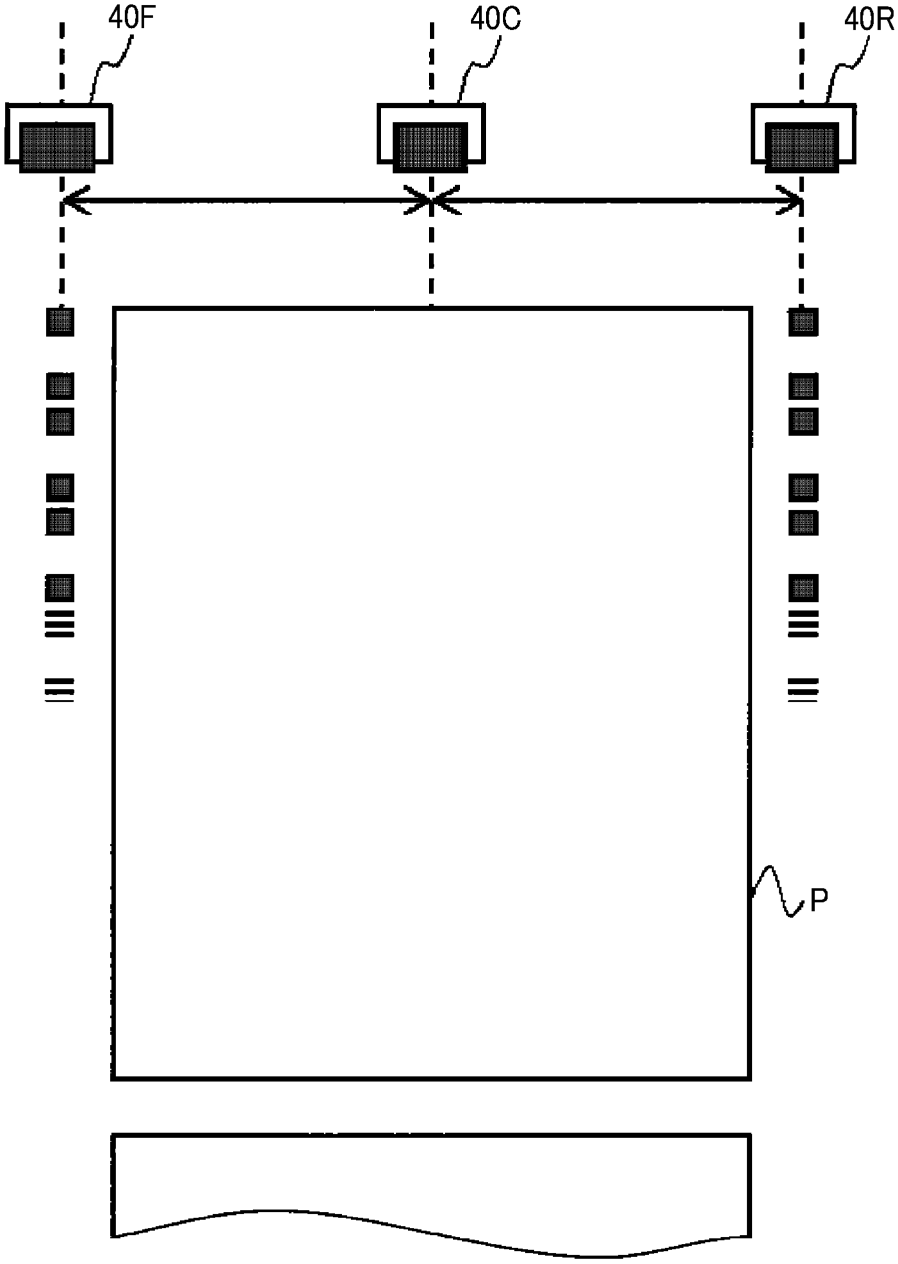
FIG. 3 is a schematic diagram illustrating an image adjustment pattern formed on the intermediate transfer belt in a case where image adjustment is performed in parallel with a printing operation.

The optical sensors 40R and 40F facing the widthwise end areas of the intermediate transfer belt 17 are disposed outside a sheet conveyance area as a recording medium conveyance area of the intermediate transfer belt 17. As illustrated in FIG. 3, during formation of a toner image to be transferred to the sheet P, the copier 1 forms an image adjustment pattern outside the sheet conveyance area and detect, with the optical sensors 40R and 40F, the toner adhesion amount of the image adjustment pattern. Based on the toner adhesion amount detected by the optical sensors 40R and 40F, the developing bias is adjusted to adjust the image density, for example.

A mother component of the toner, silica or titanium oxide added to the toner, and other so-called external additives of the toner are transferred from the photoconductor 11 to the intermediate transfer belt 17. The external additives of the toner transferred to the intermediate transfer belt 17 may adhere to the intermediate transfer belt 17 and cause filming on the intermediate transfer belt 17. In a case where the surface of the photoconductor 11 is provided with a lubricant application device that applies a lubricant, various components included in the lubricant are also transferred from the photoconductor 11 to the intermediate transfer belt 17 in addition to the external additives of the toner. The external additives of the toner and the lubricant may interact with each other and worsen the filming on the intermediate transfer belt 17. Further, paper dust may be transferred from the sheet P to the intermediate transfer belt 17 at the secondary transfer nip and may adhere to the intermediate transfer belt 17, resulting in paper dust filming.

Such filming on the intermediate transfer belt 17 is caused by filming substances, such as the external additives of the toner including silica and various components included in the lubricant, adhering to the intermediate transfer belt 17 when the intermediate transfer belt 17 receives external pressure (mainly contact pressure from the photoconductor 11). The toner fails to be placed on the filming on the intermediate transfer belt 17 when a full solid image or a halftone image is output. As a result, defective images such as an image including white spots may be formed.

In addition, the filming decreases the glossiness of the intermediate transfer belt 17. For this reason, when the filming occurs in facing areas of the intermediate transfer belt 17 facing the optical sensors 40R, 40C, and 40F, the output signals change. In other words, the optical sensors 40R, 40C, and 40F fail to favorably detect the adhesion amount of the gradation patterns on the intermediate transfer belt 17. Further, the unevenness of the filming makes the output of the optical sensors 40R, 40C, and 40F unstable and hampers correct image adjustment.

The filming may also decrease the cleaning property of the cleaning blade 31. Gradation patterns having a relatively large adhesion amount per unit area are often input to the positions of the cleaning blade 31 corresponding to the positions of the optical sensors 40R, 40C, and 40F in the width direction of the intermediate transfer belt 17. For this reason, when the gradation patterns are input to the cleaning blade 31, the filming in the facing areas of the intermediate transfer belt 17 facing the optical sensors 40R, 40C, and 40F is likely to cause the toner of the gradation patterns to pass by the cleaning blade 31, resulting in a cleaning failure.

The filming is scraped off by the toner staying at an area of contact, which may be referred to as a cleaning area in the following description, between the cleaning blade 31 and the outer circumferential surface of the intermediate transfer belt 17. Thus, the filming is removed from the outer circumferential surface of the intermediate transfer belt 17. Specifically, the uneven surface of the toner staying at the cleaning area and the pressure of the cleaning blade 31 applied to the toner scrape off the filming from the outer circumferential surface of the intermediate transfer belt 17.

For this reason, the copier 1 forms a scraping toner pattern on the intermediate transfer belt 17 at a given point in time to remove the filming from the intermediate transfer belt 17. The scraping toner pattern is input to the cleaning blade 31 so that a sufficient amount of toner stays at the cleaning area.

Figure 4:
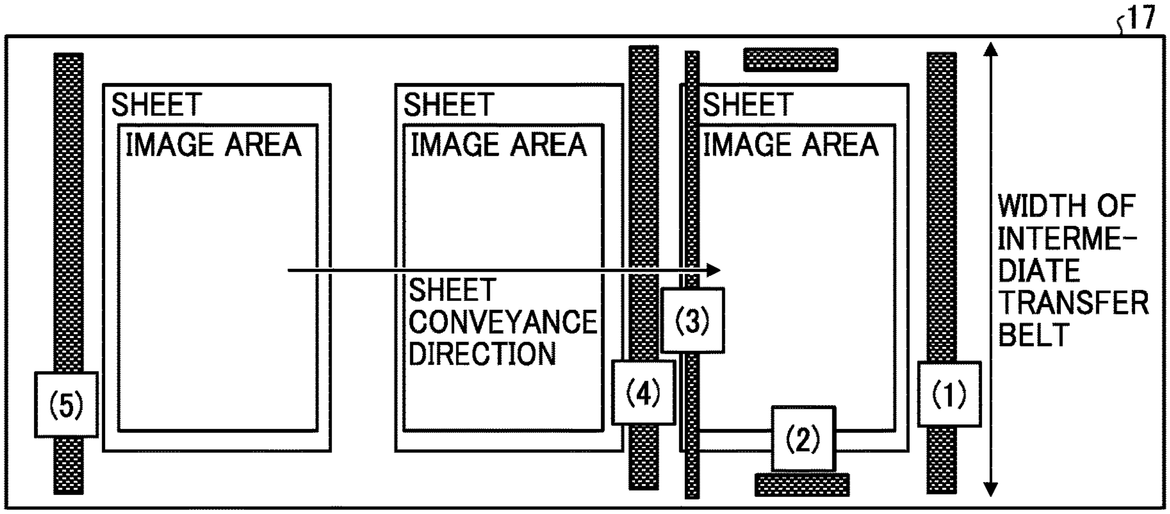
FIG. 4 is a diagram illustrating examples of position at which a scraping toner pattern is formed on the intermediate transfer belt.

FIG. 4 is a diagram illustrating examples of position at which the scraping toner pattern is formed on the intermediate transfer belt 17.

FIG. 4 illustrates a case where three sheets are continuously conveyed in a sheet conveyance direction and printed in the regular image forming operation. As illustrated in FIG. 4, the examples of the position at which the scraping toner pattern is formed include, but are not limited to: (1) a position before the first sheet to the secondary transfer nip, (2) a position outside the width of a sheet that passes through the secondary transfer nip, (3) a position in a non-image forming area at a trailing end of a sheet that passes through the secondary transfer nip, (4) a position between sheets, and (5) a position after the last sheet passes through the secondary transfer nip.

In another embodiment, the position (3) may be a position in a non-image forming area at a leading end of a sheet that passes through the secondary transfer nip. When the scraping toner pattern on the intermediate transfer belt 17 passes through the secondary transfer nip, a positive bias (i.e., a bias having a positive polarity) is applied to the opposed roller 18A. The positive bias applied to the opposed roller 18A electrostatically attracts the scraping toner pattern to the intermediate transfer belt 17, thus preventing the scraping toner pattern from being transferred to the secondary transfer roller 18 or the sheet P.

Figure 5:
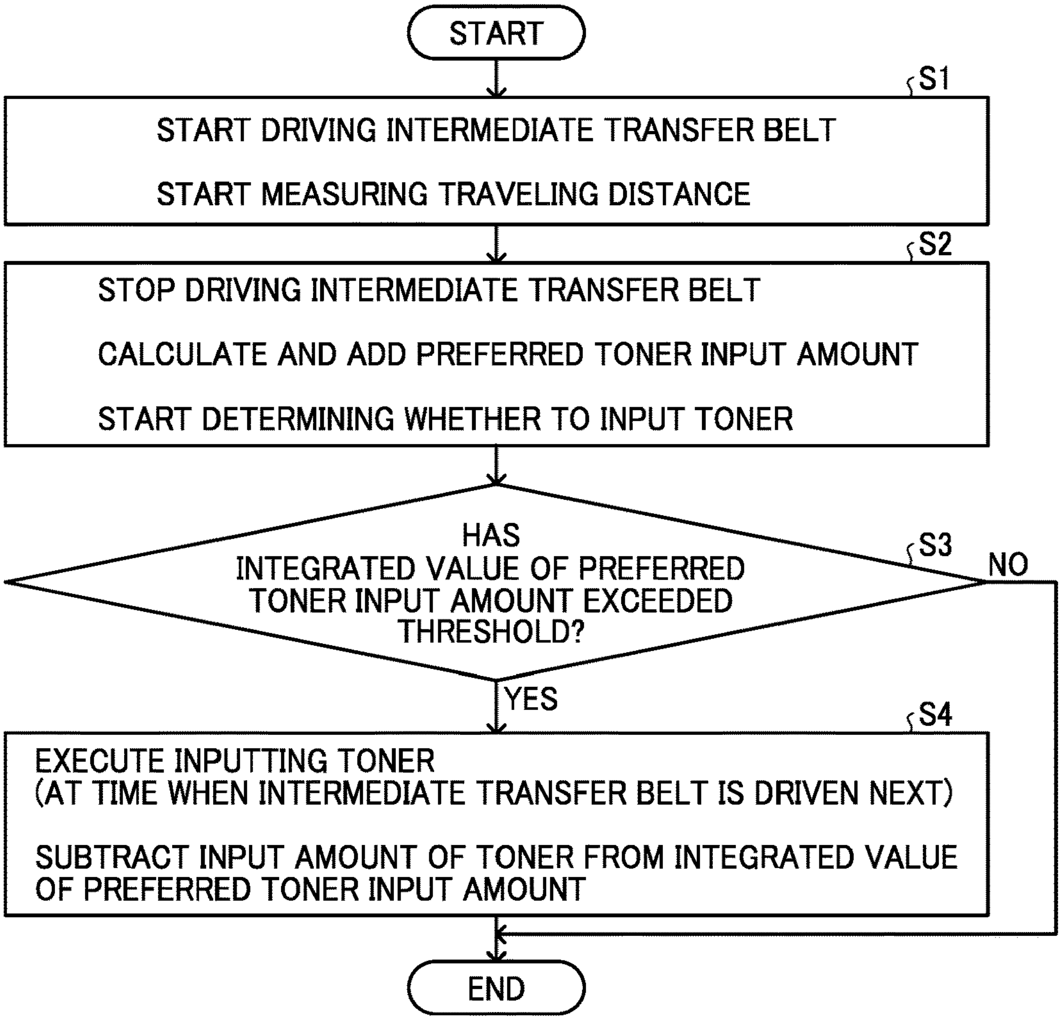
FIG. 5 is a flowchart illustrating formation of the scraping toner pattern.

FIG. 5 is a flowchart illustrating formation of the scraping toner pattern.

In step S1, a controller of the copier 1 starts driving the intermediate transfer belt 17 in response to a print command and measuring a traveling distance of the intermediate transfer belt 17.

In step S2, the controller stops driving the intermediate transfer belt 17 and calculates, based on the measured traveling distance of the intermediate transfer belt 17, a preferred toner input amount, which is an amount of toner preferred to be input to the cleaning blade 31 based on the state of filming on the outer circumferential surface of the intermediate transfer belt 17. Specifically, the controller multiplies the traveling distance of the intermediate transfer belt 17 by a coefficient, thus calculating the preferred toner input amount. Then, the controller adds the preferred toner input amount thus calculated, to calculate an integrated value of the preferred toner input amount.

In step S3, the controller determines whether the integrated value of the preferred toner input amount has exceeded a threshold. When the integrated value has not exceeded the threshold (NO in step S3), the process illustrated in FIG. 5 ends. By contrast, when the integrated value has exceeded the threshold (YES in step S3), in step S4, the scraping toner pattern is formed at the time when the intermediate transfer belt 17 is driven next. Then, the controller subtracts the amount of toner of the scraping toner pattern thus formed (i.e., the amount of toner input to the cleaning blade 31) from the integrated value of the preferred toner input amount. Thus, the process illustrated in FIG. 5 ends.

In an image forming apparatus that detects whether the filming exists with an optical sensor and forms a scraping toner pattern, even when the filming occurs outside a detection range of the optical sensor, the filming outside a facing area of an intermediate transfer belt facing the optical sensor is not removed until the filming occurs in the facing area of the intermediate transfer belt facing the optical sensor. As a result, such an image forming apparatus may fail to favorably prevent formation of defective images such as an image including white spots that may be caused by the filming.

By contrast, in the present embodiment, the scraping toner pattern is formed based on the traveling distance of the intermediate transfer belt 17. In other words, although the filming does not occur in the facing area of the intermediate transfer belt 17 facing the optical sensor device 40, the scraping toner pattern is formed when the filming possibly occur in an area other than the facing area of the intermediate transfer belt 17 facing the optical sensor device 40. Accordingly, the copier 1 favorably removes the filming from the intermediate transfer belt 17, as compared with the above-described image forming apparatus that forms the scraping toner pattern based on a result of detection performed by the optical sensor.

The coefficient may be a fixed value. Alternatively, the coefficient may be variable between a color image mode and a monochrome image mode. This is because the filming may be worse in the color image mode than in the monochrome image mode. The internal temperature of the copier 1 tends to be higher in the color image mode than in the monochrome image mode because the fixing temperature is set higher and the number of operating motors is greater in the color image mode. An increase in the internal temperature may also increase the stick-slip amount of the cleaning blade 31 and worsen the filming. In addition, in a case where the surface of the photoconductor 11 is provided with a lubricant application device that applies a lubricant, the amount of the lubricant, which is a component of the filming substances adhering to the intermediate transfer belt 17, is greater in the color image mode than in the monochrome image mode. For this reason, the filming may be worse in the color image mode than in the monochrome image mode.

To prevent such a situation, for example, a coefficient B of the color image mode is set to a value higher than a coefficient A of the monochrome image mode (A<B). Then, at the time of image formation (or at the time of driving of the intermediate transfer belt 17), the controller determines whether the mode is the monochrome image mode or the color image mode. The controller calculates the preferred toner input amount with the coefficient A in the monochrome image mode; whereas the controller calculates the preferred toner input amount with the coefficient B in the color image mode.

For example, when images are formed in the color image mode more than in the monochrome image mode, the filming is more likely to be worse than in the monochrome image mode as described above. However, when images are formed in the color image mode more than in the monochrome image mode, the scraping toner pattern is formed earlier than in the monochrome image mode because the integrated value of the preferred toner input amount exceeds the threshold with a relatively short traveling distance of the intermediate transfer belt 17. By contrast, when images are formed in the monochrome image mode more than in the color image mode, the filming is less likely to be worse than in the color image mode. In other words, when images are formed in the monochrome image mode more than in the color image mode, the scraping toner pattern is formed later than in the color image mode because the integrated value of the preferred toner input amount exceeds the threshold with a longer traveling distance of the intermediate transfer belt 17 in the monochrome image mode than in the color image mode.

Since the scraping toner pattern is formed based on the image mode, the scraping toner pattern is formed at an appropriate point in time, thus favorably preventing wasteful toner consumption and the filming from being worse.

A typical image forming apparatus forms a belt-shaped scraping toner pattern elongated in a width direction of an intermediate transfer belt and having a uniform amount of toner input to a cleaning blade in the width direction of the intermediate transfer belt, to remove the filming from the intermediate transfer belt. Although the typical image forming apparatus favorably prevents defective images such as an image including white spots that may be caused by the filming, the typical image forming apparatus fails to sufficiently prevent a decrease in accuracy of an optical sensor for detecting the adhesion amount. This is because the filming affects the decrease in the accuracy for detecting the adhesion amount greater than the defective images such as an image including white spots that may be caused by the filming. In short, even slight filming may decrease the accuracy for detecting the adhesion amount.

To address such a situation, a belt-shaped scraping toner pattern is formed as described below in the present embodiment. Specifically, the amount of toner of the scraping toner pattern input to the cleaning blade 31 is greater in the facing area of the intermediate transfer belt 17 facing the optical sensors 40R, 40C, and 40F than in non-facing areas of the intermediate transfer belt 17 facing none of the optical sensors 40R, 40C, and 40F.

Figure 6A:
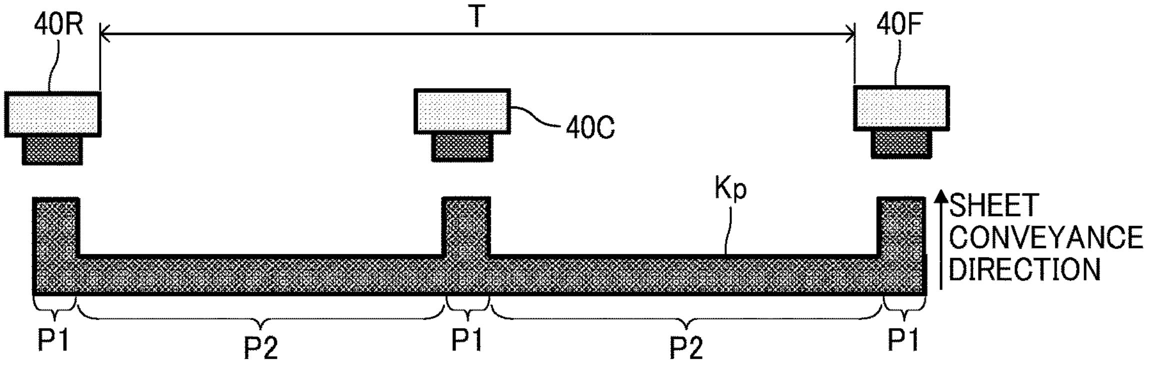
FIG. 6A is a schematic diagram illustrating an example of the scraping toner pattern according to the embodiment.
Figure 6B:
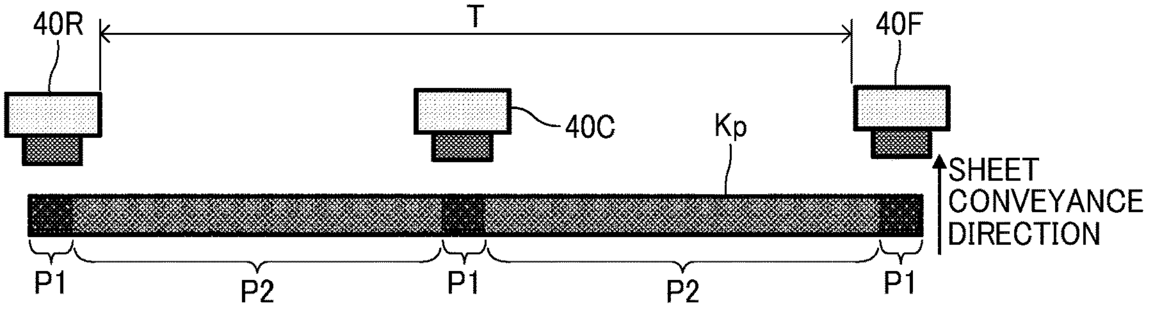
FIG. 6B is a schematic diagram illustrating another example of the scraping toner pattern according to the embodiment.

FIGS. 6A and 6B are schematic diagrams illustrating examples of a scraping toner pattern Kp according to the present embodiment.

As illustrated in FIGS. 6A and 6B, the scraping toner pattern Kp is a belt-shaped pattern having a length from the optical sensor 40F at one end in the width direction of the intermediate transfer belt 17 to the optical sensor 40R at the other end in the width direction of the intermediate transfer belt 17. The scraping toner pattern Kp is longer than a sheet conveyance area T of the intermediate transfer belt 17. Accordingly, the filming is removed from the sheet conveyance area T of the intermediate transfer belt 17 from which a toner image is transferred to the sheet P. Removal of the filming prevents defective images such as an image including white spots that may be caused by the filming.

As illustrated in FIG. 6A, the scraping toner pattern Kp has facing areas P1 facing the optical sensors 40R, 40C, and 40F and non-facing areas P2 facing none of the optical sensors 40R, 40C, and 40F. The facing areas P1 are longer than the non-facing areas P2 in a traveling direction (or surface moving direction) of the intermediate transfer belt 17 parallel to the sheet conveyance direction in FIG. 2. Accordingly, the amount of toner input to the portions of the cleaning blade 31 corresponding to the positions of the optical sensors 40R, 40C, and 40F in the width direction of the intermediate transfer belt 17 is greater than the amount of toner input to the other portions of the cleaning blade 31.

Alternatively, as illustrated in FIG. 6B, the toner adhesion amount may be greater in the facing area P1 than in the non-facing area P2 of the scraping toner pattern Kp. Like the example illustrated in FIG. 6A, in the present example illustrated in FIG. 6B, the amount of toner input to the portions of the cleaning blade 31 corresponding to the positions of the optical sensors 40R, 40C, and 40F in the width direction of the intermediate transfer belt 17 is greater than the amount of toner input to the other portions of the cleaning blade 31.

The toner stays at the cleaning area of the cleaning blade 31 for a relatively long time due to an increased amount of toner input to the portions of the cleaning blade 31 corresponding to the positions of the optical sensors 40R, 40C, and 40F in the width direction of the intermediate transfer belt 17. Accordingly, the effect of removing the filming from the intermediate transfer belt 17 with the toner is enhanced. As a result, the filming is favorably removed from the facing areas of the intermediate transfer belt 17 facing the optical sensors 40R, 40C, and 40F and the accuracy for detecting the toner adhesion amount is enhanced.

On the other hand, the amount of toner input to a portion of the cleaning blade 31 other than the portions of the cleaning blade 31 corresponding to the positions of the optical sensors 40R, 40C, and 40F in the width direction of the intermediate transfer belt 17 is smaller than the amount of toner input to the portions corresponding to the positions of the optical sensors 40R, 40C, and 40F in the width direction of the intermediate transfer belt 17. Note that the portion of the cleaning blade 31 other than the portions corresponding to the positions of the optical sensors 40R, 40C, and 40F in the width direction of the intermediate transfer belt 17 may be referred to as a non-corresponding portion in the following description. The filming may be removed from the intermediate transfer belt 17 by the toner input to the non-corresponding portion of the cleaning blade 31 to such an extent that does not generate defective images such as an image including white spots that may be caused by the filming. The filming affects defective images such as an image including white spots that may be caused by the filming less than the decrease in the accuracy for detecting the toner adhesion amount due to the filming. For this reason, if a slight amount of filming remains on the intermediate transfer belt 17, defective images such as an image including white spots that may be caused by the filming is prevented. Accordingly, with a small input toner amount, the filming on the intermediate transfer belt 17 is reduced to such an extent that does not generate defective images such as an image including white spots that may be caused by the filming.

As described above, in the present embodiment, the amount of toner of the scraping toner pattern input to the cleaning blade 31 differs in the width direction of the intermediate transfer belt 17. Thus, the present embodiment reduces wasteful consumption of the toner and prevents occurrence of defective images and the decrease in the accuracy for detecting the toner adhesion amount, as compared with a case where the toner is input to a cleaning blade with a uniform amount in a width direction of an intermediate transfer belt.

In a comparative image forming apparatus as a comparative example of image forming apparatus, a surface of an intermediate transfer belt as an image bearer is divided into a plurality of areas in a width direction of the intermediate transfer belt, which is an orthogonal direction orthogonal to a traveling direction (or surface moving direction) of the intermediate transfer belt. The comparative image forming apparatus forms a scraping toner pattern only in an area of the plurality of areas in which the filming occurs. The comparative image forming apparatus detects whether the filming occurs for each of the areas with an optical sensor as an adhesion amount detector disposed for each of the areas. By contrast, in the present embodiment, the scraping toner pattern is a belt-shaped pattern elongated in the width direction of the intermediate transfer belt 17. The toner of the scraping toner pattern is input to the cleaning blade 31 over the entire area in the width direction of the intermediate transfer belt 17. As a result, the filming is removed over the entire area in the width direction of the intermediate transfer belt 17. Unlike the comparative image forming apparatus described above, the copier 1 serving as an image forming apparatus does not detect, with an optical sensor, which widthwise area of the intermediate transfer belt 17 bears the filming. Accordingly, an unfavorable situation is prevented that the filming outside the detection range of the optical sensor is not removed unless the filming occurs within the detection range of the optical sensor. Thus, the copier 1 favorably removes the filming, as compared with the comparative image forming apparatus described above.

In the present embodiment, the amount of toner input to the portions of the cleaning blade 31 corresponding to the positions of the optical sensors 40R, 40C, and 40F in the width direction of the intermediate transfer belt 17 is twice the amount of toner input to the non-corresponding portion of the cleaning blade 31. The difference between the amount of toner input to the portions of the cleaning blade 31 corresponding to the positions of the optical sensors 40R, 40C, and 40F in the width direction of the intermediate transfer belt 17 and the amount of toner input to the non-corresponding portion of the cleaning blade 31 may be determined as appropriate for the configuration of the copier 1.

The scraping toner pattern Kp may be a combination of the scraping toner patterns Kp illustrated in FIGS. 6A and 6B. Specifically, the toner adhesion amount is greater in the facing area P1 than in the non-facing area P2 while the facing area P1 is longer than the non-facing area P2 in the traveling direction of the intermediate transfer belt 17. With such a configuration, the amount of toner input to the portions of the cleaning blade 31 corresponding to the positions of the optical sensors 40R, 40C, and 40F in the width direction of the intermediate transfer belt 17 is greater than the amount of toner input to the other portions of the cleaning blade 31.

Figure 7:
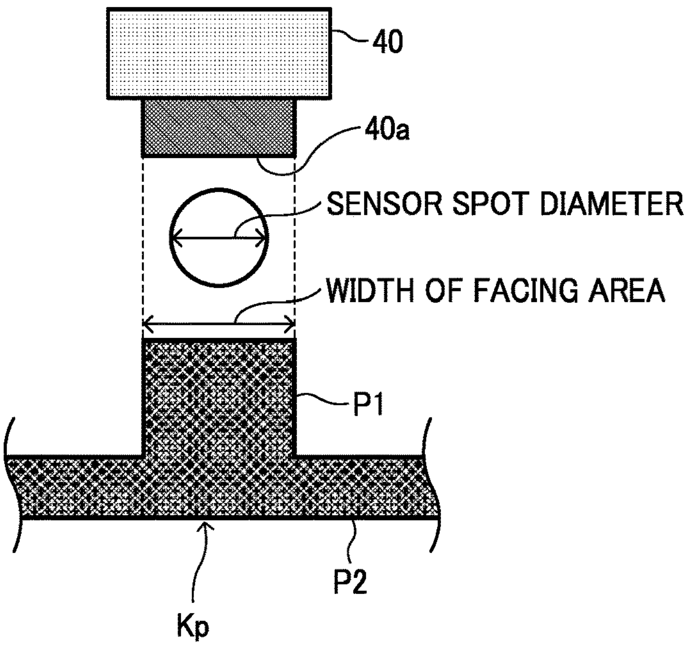
FIG. 7 is a diagram illustrating the width of a facing area of the scraping toner pattern.

FIG. 7 is a diagram illustrating the width of the facing area P1 of the scraping toner pattern Kp.

The width of the facing area P1 of the scraping toner pattern Kp corresponds to the size of a lens 40*a* of each of the optical sensors 40R, 40C, and 40F and is equal to or greater than a sensor spot diameter, which is a detection range of each of the optical sensors 40R, 40C, and 40F. Accordingly, at least the filming in the detection range of the optical sensors 40R, 40C, and 40F on the intermediate transfer belt 17 is favorably removed by the toner input to the cleaning blade 31. Thus, the accuracy of the optical sensor device 40 for detecting the toner adhesion amount is enhanced. Since the width of the facing area P1 of the scraping toner pattern Kp corresponds to the size of the lens 40*a* of each of the optical sensors 40R, 40C, and 40F, wasteful consumption of toner is reduced in the present embodiment as compared with a case where the width of a facing area of a scraping toner pattern exceeds the size of a lens of an optical sensor.

In the present embodiment, each of the optical sensors 40R, 40C, and 40F includes a light receiving element that receives diffusely reflected light and a light receiving element that receives specularly reflected light. An optical sensor that receives both the specularly reflected light and the diffusely reflected light has two types of sensor spot diameters: a specular reflection spot diameter and a diffuse reflection spot diameter. The facing area P1 of the scraping toner patterns Kp is wider than both of the specular reflection spot diameter and the diffuse reflection spot diameter.

Now, a description is given of the measurement of the sensor spot diameter of an optical sensor.

Figure 8:
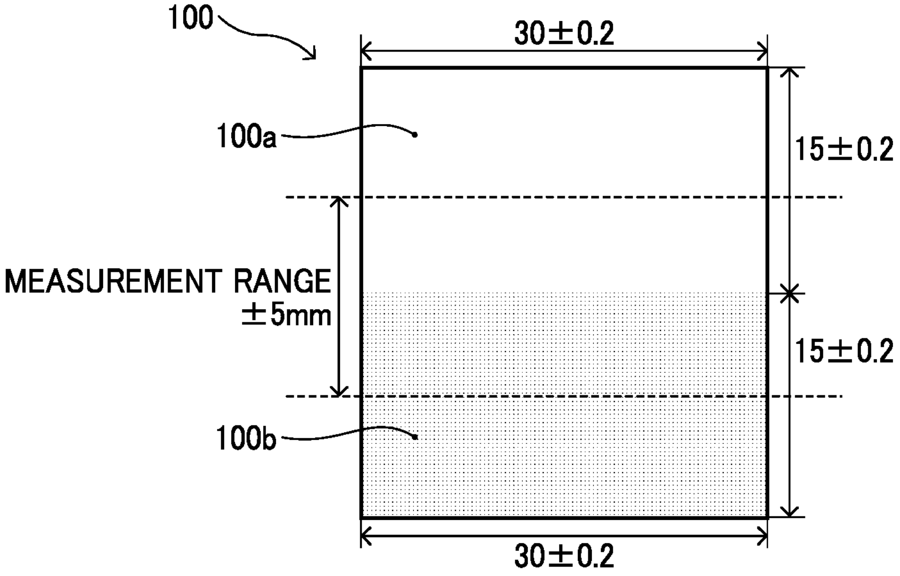
FIG. 8 is a schematic view of a reference board that is used to measure a sensor spot diameter.

FIG. 8 illustrates a reference board 100 that is used to measure the sensor spot diameter. The reference board 100 includes a specular reflection substrate 100*a* made of glass and a diffuse reflection substrate 100*b* made of resin and having a rough surface. The specular reflection substrate 100*a* is illustrated in FIG. 8 as an upper part of the reference board 100; whereas the diffuse reflection substrate 100*b* is illustrated in FIG. 8 as a lower part of the reference board 100.

The reference board 100 has a measurement range facing the optical sensor. The scanning is performed downward in FIG. 8 at a pitch of 0.1 mm from a position at +5 mm of the measurement range to acquire a specular reflection output VO1 and a diffuse reflection output VO2.

Figure 9A:
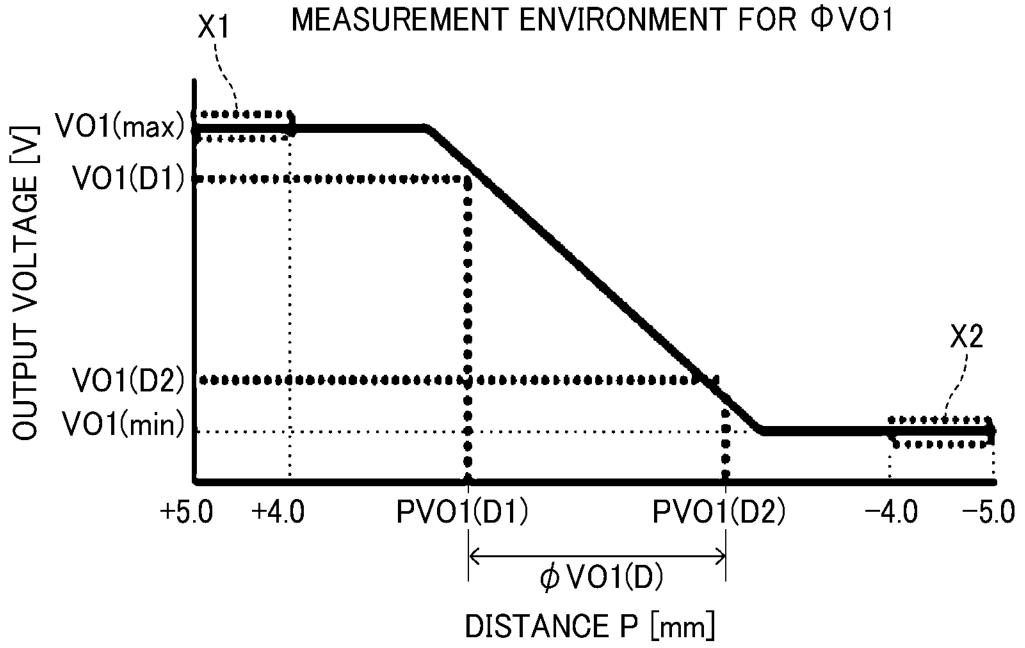
FIG. 9A is a graph illustrating an example of acquired specular reflection output.
Figure 9B:
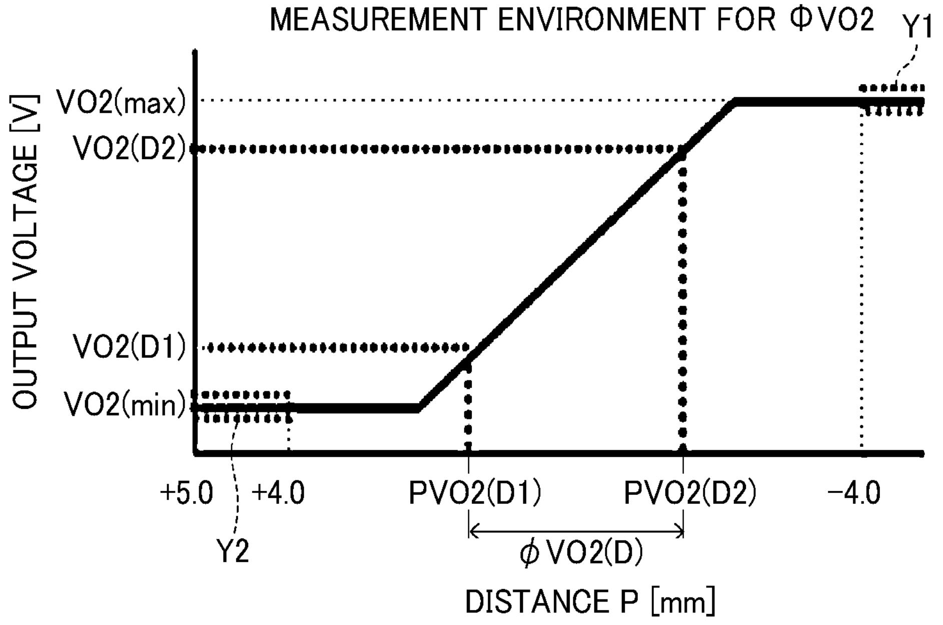
FIG. 9B is a graph illustrating an example of acquired diffuse reflection output.

FIG. 9A illustrates an example of the specular reflection output VO1 thus acquired. FIG. 9B illustrates an example of the diffuse reflection output VO2 thus acquired. In FIGS. 9A and 9B, the horizontal axis represents a distance P from the boundary between the specular reflection substrate 100*a* and the diffuse reflection substrate 100*b* of the reference board 100. Specifically, the distance P from the boundary toward the specular reflection substrate 100*a* is positive and the distance P from the boundary toward the diffuse reflection substrate 100*b* is negative.

As is clear from FIG. 9A, when an entire specular reflection spot is on the specular reflection substrate 100*a*, the specular reflection output VO1 of the optical sensor indicates a maximum value VO1(max). As the reference board 100 is scanned, part of the specular reflection spot enters the diffuse reflection substrate 100*b*. Then, the specular reflection output VO1 decreases. As the reference board 100 is further scanned, the diffuse reflection substrate 100*b* accounts for an increased percentage of the specular reflection spot. Accordingly, the specular reflection output VO1 decreases. When the entire specular reflection spot enters the diffuse reflection substrate 100*b*, the specular reflection output VO1 indicates a minimum value VO1(min).

On the other hand, as is clear from FIG. 9B, when an entire diffuse reflection spot is on the specular reflection substrate 100*a*, the diffuse reflection output VO2 of the optical sensor indicates a minimum value VO2(min). As the reference board is scanned and part of the diffuse reflection spot enters the diffuse reflection substrate 100*b*, the diffuse reflection output VO2 gradually increases.

When the entire diffuse reflection spot enters the diffuse reflection substrate 100*b*, the diffuse reflection output VO2 indicates a maximum value VO2(max).

To calculate a specular reflection spot diameter φVO1(D), first, the controller calculates the ten-point mean value of an area that is indicated by a broken line X1 (i.e., an area in a range of from +5.0 mm to +4.0 mm) in FIG. 9A and that indicates detection of the specular reflection substrate 100*a* of the reference board 100 to obtain the maximum value VO1(max) of the specular reflection output VO1. Next, the controller calculates the ten-point mean value of an area that is indicated by a broken line X2 (i.e., an area in a range of from −4.0 mm to −5.0 mm) in FIG. 9A and that indicates detection of the diffuse reflection substrate 100*b* of the reference board 100 to obtain the minimum value VO1(min) of the specular reflection output VO1.

Next, the controller obtains a first distance PVO1(D1) at which the specular reflection output VO1 is equal to or less than (VO1(max)−VO1(min))×0.9+VO1(min). The controller also obtains a first distance PVO1(D2) at which the specular reflection output VO1 is equal to or less than (VO1(max)−VO1(min))×0.1+VO1(min). The specular reflection spot diameter φVO1(D) is obtained from Equation 1 below.

$$\varphi VO1(D)=PVO1(D1)-PVO1(D2) \quad \text{(Equation 1)}$$

The calculation of a diffuse reflection spot diameter φVO2(D) is substantially the same as the calculation of the specular reflection spot diameter φVO1(D). Specifically, first, the controller calculates the ten-point mean value of an area that is indicated by a broken line Y2 (i.e., an area in a range of from +5.0 mm to +4.0 mm) in FIG. 9B and that indicates detection of the specular reflection substrate 100*a* of the reference board 100 to obtain the minimum value VO2(min) of the diffuse reflection output VO2. Next, the controller calculates the ten-point mean value of an area that is indicated by a broken line Y1 (i.e., an area in a range of from −4.0 mm to −5.0 mm) in FIG. 9B and that indicates detection of the diffuse reflection substrate 100*b* of the reference board 100 to obtain the maximum value VO2 (max) of the diffuse reflection output VO2.

Next, the controller obtains a first distance PVO2(D1) at which the diffuse reflection output VO2 is equal to or less than (VO2(max)−VO2(min))×0.1+VO2(min). The controller also obtains a first distance PVO2(D2) at which the diffuse reflection output VO2 is equal to or less than (VO2(max)−VO2(min))×0.9+VO2(min). The diffuse reflection spot diameter φVO2(D) is obtained from Equation 2 below.

$$\varphi VO2(D)=PVO2(D1)-PVO2(D2) \quad \text{(Equation 2)}$$

Although the image forming apparatus employs an intermediate transfer method in the embodiments and examples described above, the image forming apparatus may employ a direct transfer method to directly transfer a toner image from a photoconductor onto a sheet as a recording medium, instead of the intermediate transfer method. In the image forming apparatus employing the direct transfer method, the image bearer corresponds to the photoconductor while the transferrer corresponds to a transfer roller that contacts the photoconductor to form a transfer nip. In addition, the cleaner corresponds to a photoconductor cleaning blade that cleans the surface of the photoconductor. The image forming device includes a charging device, a writing device (exposure device), and a developing device.

Although specific embodiments and examples are described, the embodiments and examples according to the present disclosure are not limited to those specifically described herein. Several aspects of the image forming apparatus are exemplified as follows.

Now, a description is given of a first aspect.

An image forming apparatus such as the copier 1 includes: an image forming device such as the image forming device 10 that forms a toner image, an image bearer such as the intermediate transfer belt 17 that bears the toner image formed by the image forming device, a transferrer such as the secondary transfer roller 18 that transfers the toner image from the image bearer to a recording medium such as the sheet P, a cleaner such as the cleaning blade 31 that cleans a surface of the image bearer, and an adhesion amount detector such as the optical sensors 40R, 40C, and 40F facing the surface of the image bearer to detect a toner adhesion amount of the toner image. The image forming device forms, on the image bearer, a toner image pattern such as the scraping toner pattern Kp to be input to the cleaner without being transferred to the recording medium. The toner image pattern is a belt-shaped pattern elongated in an orthogonal direction orthogonal to a traveling direction (or surface moving direction) of the image bearer. The image forming device forms the toner image pattern such that an amount of toner input to a portion of the cleaner corresponding to a position of the adhesion amount detector in the orthogonal direction is greater than an amount of toner input to a portion of the cleaner not corresponding to the position of the adhesion amount detector in the orthogonal direction.

The comparative image forming apparatus includes an adhesion amount detector such as optical sensor for each of the plurality of areas into which the surface of the image bearer is divided in the orthogonal direction, to form a toner image pattern in an area of the plurality of areas in which the adhesion amount detector detects the filming. In the comparative image forming apparatus, the filming outside a detection range of the adhesion amount detector on the surface of the image bearer is not removed until the filming occurs in the detection range of the adhesion amount detector. In short, the comparative image forming apparatus fails to favorably remove the filming in a width direction of the image bearer (i.e., the orthogonal direction).

By contrast, according to the first aspect, the toner image pattern is a belt-shaped pattern elongated in the orthogonal direction orthogonal to the traveling direction of the image bearer. The toner of the toner image pattern is input to the cleaner over the entire area in the orthogonal direction. Thus, the filming is removed over the entire area in the orthogonal direction. Accordingly, unlike the comparative image forming apparatus described above, the image forming apparatus according to the first aspect forms the belt-shaped pattern at a time when the filming may occur based on, e.g., a traveling distance of the image bearer without detecting, with the adhesion amount detector such as an optical sensor, whether the filming occurs in the areas into which the surface of the image bearer is divided in the orthogonal direction. Thus, the image forming apparatus according to the first aspect favorably removes the filming, as compared with the comparative image forming apparatus that uses a plurality of adhesion amount detectors to detect an area bearing the filming and forms the toner pattern only in the area bearing the filming.

As described in the embodiment above, the image forming apparatus according to the first aspect inputs the toner image pattern to the cleaner. The toner of the toner image pattern stays at a contact portion of the cleaner in contact with the image bearer and scrapes off the filming from the image bearer. Accordingly, the image forming apparatus according to the first aspect prevents defective images such as an image including white spots that may be caused by the filming.

As described above, the amount of toner input to the portion of the cleaner corresponding to the position of the adhesion amount detector in the orthogonal direction is greater than the amount of toner input to the portion of the cleaner not corresponding to the position of the adhesion amount detector in the orthogonal direction. In other words, the toner stays for a relatively long time at the portion of the cleaner corresponding to the position of the adhesion amount detector in the orthogonal direction and scrapes off the filming for a longer period of time than at the portion of the cleaner not corresponding to the position of the adhesion amount detector in the orthogonal direction. Thus, the filming in a facing area of the image bearer facing the adhesion amount detector is removed more than in a non-facing area of the image bearer not facing the adhesion amount detector. Accordingly, the filming in the facing area is less than the filming in the non-facing area. Thus, the image forming apparatus according to the first aspect favorably reduces a detection error of the adhesion amount detector that is more susceptible to the influence of the filming than an image abnormality that may be caused by the filming.

The image forming apparatus according to the first aspect also reduces the consumption of toner of the toner image pattern, while reducing the detection error of the adhesion amount detector, as compared with a typical image forming apparatus that inputs toner of a toner image pattern to a cleaner with a uniform amount in a direction orthogonal to a traveling direction of an image bearer.

Now, a description is given of a second aspect.

In the image forming apparatus such as the copier 1 according to the first aspect, the toner image pattern such as the scraping toner patterns Kp has an area such as the facing area P1 from which the toner of the toner image pattern is input to the portion of the cleaner such as the cleaning blade 31 corresponding to the position of the adhesion amount detector such as the optical sensors 40R, 40C, and 40F in the orthogonal direction. The area is longer than another area other than the area of the toner image pattern in the traveling direction of the image bearer such as the intermediate transfer belt 17.

Accordingly, as described above with reference to FIG. 6A, the amount of toner input to the portion of the cleaner such as the cleaning blade 31 corresponding to the position of the adhesion amount detector such as the optical sensors 40R, 40C, and 40F in the orthogonal direction is greater than the amount of toner input to the portion of the cleaner not corresponding to the position of the adhesion amount detector in the orthogonal direction.

Now, a description is given of a third aspect.

In the image forming apparatus such as the copier 1 according to the first or second aspect, the toner image pattern such as the scraping toner patterns Kp has an area such as the facing area P1 from which the toner of the toner image pattern is input to the portion of the cleaner such as the cleaning blade 31 corresponding to the position of the adhesion amount detector such as the optical sensors 40R, 40C, and 40F in the orthogonal direction. The toner image pattern includes a greater amount of toner in the area than in another area other than the area of the toner image pattern.

Accordingly, as described above with reference to FIG. 6B, the amount of toner input to the portion of the cleaner such as the cleaning blade 31 corresponding to the position of the adhesion amount detector such as the optical sensors 40R, 40C, and 40F in the orthogonal direction is greater than the amount of toner input to the portion of the cleaner not corresponding to the position of the adhesion amount detector in the orthogonal direction.

Now, a description is given of a fourth aspect.

In the image forming apparatus such as the copier 1 according to any one of the first to third aspects, the toner image pattern such as the scraping toner patterns Kp has an area such as the facing area P1 from which the toner of the toner image pattern is input to the portion of the cleaner such as the cleaning blade 31 corresponding to the position of the adhesion amount detector such as the optical sensors 40R, 40C, and 40F in the orthogonal direction. The area has a range equal to or greater than an adhesion amount detection range of the adhesion amount detector.

Accordingly, as described above with reference to FIG. 7, at least the filming in the detection range of the adhesion amount detector such as the optical sensors 40R, 40C, and 40F on the image bearer such as the intermediate transfer belt 17 is favorably removed by the toner input to the cleaner such as the cleaning blade 31.

Thus, the image forming apparatus according to the fourth aspect enhances the accuracy of the adhesion amount detector for detecting the toner adhesion amount.

Now, a description is given of a fifth aspect.

In the image forming apparatus such as the copier 1 according to the fourth aspect, the adhesion amount detector is an optical sensor. The adhesion amount detection range is a spot diameter of the optical sensor.

Now, a description is given of a sixth aspect.

In the image forming apparatus such as the copier 1 according to any one of the first to fifth aspects, further includes a plurality of adhesion amount detectors including the above-described optical sensor such as the optical sensors 40R, 40C, and 40F in the orthogonal direction (i.e., the direction orthogonal to the traveling direction of the image bearer such as the intermediate transfer belt 17). At least one of the plurality of adhesion amount detectors is disposed outside a recording medium conveyance area of the image bearer.

As described above with reference to FIG. 3, during formation of a toner image to be transferred to the recording medium, the image forming apparatus according to the sixth aspect forms an image adjustment pattern and detect, with the plurality of adhesion amount detectors, the toner adhesion amount of the image adjustment pattern to perform image adjustment such as image density adjustment.

According to the embodiments of the present disclosure, the filming is favorably removed from the image bearer.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An image forming apparatus comprising:

an image forming device configured to form a toner image;

an image bearer configured to bear the toner image formed by the image forming device;

a transferrer configured to transfer the toner image from the image bearer to a recording medium;

a cleaner configured to clean a surface of the image bearer; and an adhesion amount detector facing the surface of the image bearer to detect a toner adhesion amount of the toner image, the image forming device being configured to form, on the image bearer, a toner image pattern to be input to the cleaner without being transferred to the recording medium, the toner image pattern being a belt-shaped pattern elongated in an orthogonal direction orthogonal to a traveling direction of the image bearer, the toner image pattern having a greater amount of toner input to a portion of the cleaner corresponding to a position of the adhesion amount detector in the orthogonal direction than an amount of toner input to a portion of the cleaner not corresponding to the position of the adhesion amount detector in the orthogonal direction.

2. The image forming apparatus according to claim 1, wherein the toner image pattern has an area from which the toner of the toner image pattern is input to the portion of the cleaner corresponding to the position of the adhesion amount detector in the orthogonal direction, and wherein the area is longer than another area other than the area of the toner image pattern in the traveling direction of the image bearer.

3. The image forming apparatus according to claim 1, wherein the toner image pattern has an area from which the toner of the toner image pattern is input to the portion of the cleaner corresponding to the position of the adhesion amount detector in the orthogonal direction, and wherein the toner image pattern includes a greater amount of toner in the area than in another area other than the area of the toner image pattern.

4. The image forming apparatus according to claim 1, wherein the toner image pattern has an area from which the toner of the toner image pattern is input to the portion of the cleaner corresponding to the position of the adhesion amount detector in the orthogonal direction, and wherein the area has a range equal to or greater than an adhesion amount detection range of the adhesion amount detector.

5. The image forming apparatus according to claim 4, wherein the adhesion amount detector is an optical sensor, and wherein the adhesion amount detection range is a spot diameter of the optical sensor.

6. The image forming apparatus according to claim 1, further comprising a plurality of adhesion amount detectors including the adhesion amount detector in the orthogonal direction, wherein at least one of the plurality of adhesion amount detectors is disposed outside a recording medium conveyance area of the image bearer.

7. The image forming apparatus according to claim 1, wherein the image forming apparatus forms the toner image on a photoconductor and transfers the toner image from the photoconductor to the image bearer, wherein the image forming apparatus further comprises:

a lubricant application device to apply a lubricant to the photoconductor.

* * * * *